Jan. 26, 1954    A. A. ANDERSEN ET AL    2,667,064
MOISTURE TESTER

Filed Nov. 12, 1949    2 Sheets-Sheet 1

INVENTORS
Arthur A. Andersen
Bernard C. Mathews
BY
Eugene M. Giles
Atty.

Jan. 26, 1954
A. A. ANDERSEN ET AL
2,667,064
MOISTURE TESTER
Filed Nov. 12, 1949
2 Sheets-Sheet 2
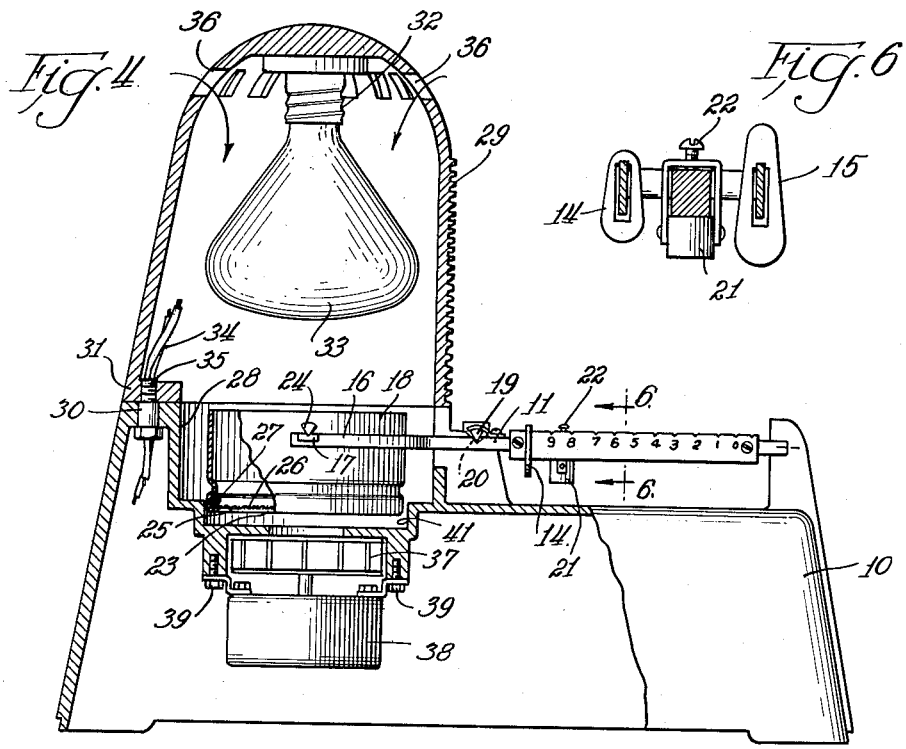
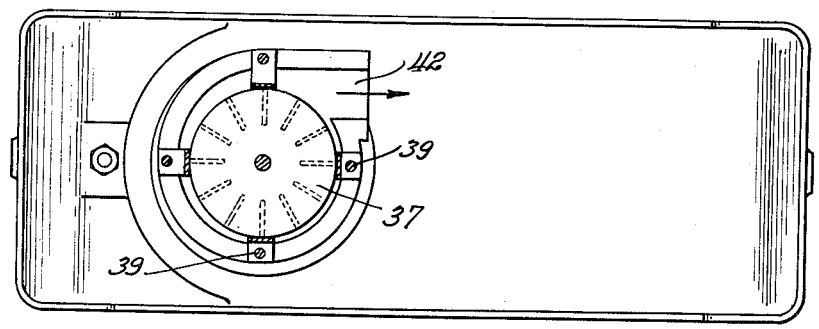
INVENTORS.
Arthur A. Andersen
Bernard C. Mathews
BY
Eugene M. Giles
Atty.

Patented Jan. 26, 1954

2,667,064

UNITED STATES PATENT OFFICE 2,667,064

MOISTURE TESTER

Arthur A. Andersen, Crystal Lake, and Bernard C. Mathews, Cary, Ill., assignors to American Crop-Drying Equipment Company, Crystal Lake, Ill., a corporation of Illinois Application November 12, 1949, Serial No. 126,816

1 Claim. (Cl. 73—76)

Our invention relates to a device for determining the moisture content in a sample of bulk material and refers more particularly to a combined moisture remover and weighing device having a scale whereon the percentage of moisture content is directly indicated on the scale.

Heretofore there has been no simple and convenient device for determining accurately the percentage of moisture content of bulk materials such as grain and the like. With our present invention a weighing device is provided in combination with dehydrating means whereby a sample of the material to be tested is dehydrated by mere application of heat and air circulation in the position in which it is weighed out on the scale, and the latter indicates in percentage the amount of moisture thus removed.

The objects of our invention are to determine conveniently the moisture content of any selected material; to measure the moisture content of such material directly in percentage of its weight; to provide facilities for removing the moisture content from such material while it is in weighing position and for weighing it before and after removal of the moisture; to provide facilities for dehydrating the material rapidly; to apply heat upon and circulate air through the material while it is in the weighing position; to utilize a scale beam graduated in percentages to show the amount of moisture removed in percentage of material weight; and to provide a simple, compact, portable apparatus for practicing our invention, these and other objects being accomplished as hereinafter described, reference being had to the accompanying drawing in which:

Fig. 4 is a sectional view on the line 4—4 of Fig. 1;

Fig. 5 is an underneath view of the moisture testing device; and

Fig. 6 is an enlarged sectional view on the line 6—6 of Fig. 4.

Figure 1:
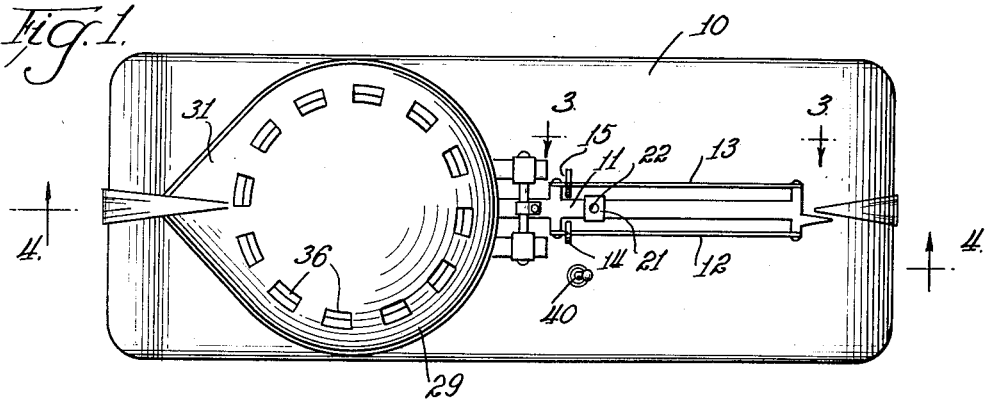
Fig. 1 is a top view of a moisture testing device embodying our invention.
Figure 2:
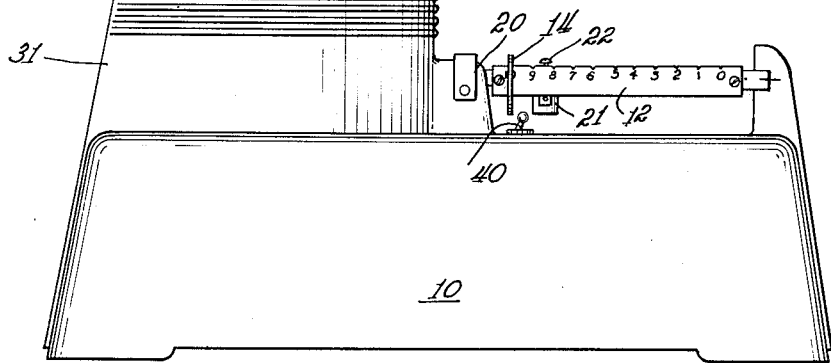
Fig. 2 is a side view of such a moisture testing device.
Figure 3:
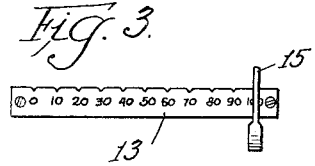
Fig. 3 is a view on the line 3—3 of Fig. 1.

Referring now to the drawing, our moisture testing device has a base of generally rectangular form as shown in Fig. 1 and this base is designated hereinafter by the reference numeral 10. A beam type of weighing device is mounted on the base 10 and comprises a beam 11 with a front scale 12 and a back scale 13 with movable weights 14 and 15, respectively. At the opposite end of the beam 11 is a semi-circular yoke 16 having a V-bearing 17 at the outer end of each arm thereof adapted to support a container 18 for the material to be tested. The scale beam 11 is supported by means of the knife-edge fulcrum 19 which is seated on the V-bearings 20. The beam 11 has a compensator 21 thereon for accurately balancing the scale, and said compensator 21 is provided with a set screw 22 for locking it in the adjusted position.

The container 18 is substantially cup-shaped and is provided with a bottom 23. At diametrically opposite sides, the container 18 is provided with projecting knife-edge fulcrums 24 which are adapted to be supported upon the V-bearings 17 in the respective arms of the yoke 16.

The bottom 23 of the container 18 is provided with a plurality of circular openings 25 and may then be covered with a wire screen 26, which is held in place by means of a circular wire clip 27. The wire screen 26 may be of coarse or fine mesh, depending upon the type of material to be tested in the container 18. Where an especially fine textured material is to be tested, it may be preferable to cover the wire screen 26 with a layer of filter paper. The particular screen or filter paper which is used, is, of course, selected with a view toward insuring the maximum air permeability in the particular material to be tested.

The container 18 is enclosed within a dehydrating chamber 28 and the said chamber, which is preferably of circular contour, is capped by a retractable dome 29 of substantially the same diameter. The dome 29 is pivotally mounted at one end of the base 10 by means of a hinge pin 30, as shown in Fig. 4, thus permitting the dome 29 to be moved away from its position over the dehydrating chamber 28 so as to provide convenient access to the material container 18. The hinge pin 30 is preferably connected to an eccentric offset portion 31 on the outer edge of the dome 29 so that when the dome 29 is moved to one side of the dehydrating chamber 28, it completely exposes the said chamber.

An electrical socket 32 is mounted in an inverted position under the top of the dome 29, and an infra red lamp 33 is inserted in the socket 32, as shown in Fig. 4, so that when the dome 29 is in its normal closed position over the dehydrating chamber 28, the infra red lamp 33 is disposed immediately above and aimed at the container 18 so that the heat radiated by the said lamp will heat and penetrate the material to be dehydrated in the container 18.

The socket 32 is connected with a source of electricity (not shown) by means of wires 34 which lead from the dome 29 through a longitudinal passage 35 in the hinge pin 30, as shown in Fig. 4.

Several openings 36 are provided in the top of the dome 29 around the socket 32 so as to permit the intake of air into the said dome.

An air withdrawal fan 37 is located in the base 10 at the bottom of the dehydrating chamber 28. The said air withdrawal fan 37 is located immediately under the container 18 and is fixed on the shaft of the motor 38 which is secured to the bottom of the dehydrating chamber 28 by means of screws 39. Current is supplied to the motor 38 and the infra red lamp 33 through the switch 40.

By evacuating air from the dehydrating chamber 28, the air withdrawal fan 37 serves to draw air into the dome through the intake openings 36. It causes the air to be heated by circulating it past the infra red lamp 33 and draws the heated air down through the material in the container 18. A minimum of clearance is provided between the base of the container 18 and the circular recess 41 in the bottom of the dehydrating chamber 28 so that a minimum of air is permitted to by-pass the container 18. The heated air passing through the heated material serves to carry off moisture vaporized by the radiant heat from the infra red lamp 33, the rate of such carrying off depending upon how closely the material in the container is compacted and the permeability of the screen or filter paper in the base of the container.

The fan 37 is provided with an exhaust 42 which opens into the base 10 and the heated, moisture-laden air withdrawn by the fan 37 from the dehydrating chamber 28 is evacuated therethrough into the open base and escapes under the edges of the base.

In using this moisture testing device, the dome 29 is first swung to one side of the dehydrating chamber 28 in order to permit access to the container 18. A screen 26 of suitable mesh or filter paper is placed in the bottom of the container 18. The movable weight 15 on the back scale 13, which is calibrated in steps of 10% from 0 to 90, is moved to the 90 notch at the inner end of the scale. The weight 14 on the front scale 12, which is calibrated in percentage units from 1 to 10, is moved to the 10 notch at the inner end of the scale. The scale is then brought into balance by adjusting the compensator 21 as required and the said compensator 21 is then secured in position by means of the set screw 22. The weights 14 and 15 are then moved to the zero positions at the outer ends of the scales 12 and 13, respectively, and a sufficient quantity of the material to be tested is then placed in the container 18 so as to again bring the scale into balance. The dome 29 is then moved back into alignment with the dehydrating chamber 28 and the switch 40 is moved to the "on" position, thus turning on the infra red lamp 33 and the air withdrawal fan 37.

The lamp 33 and the fan 37 are kept in operation until the sample of material in the container 21 is completely dehydrated.

After dehydration, the same of material is re-weighed by adjusting the respective scale weights 14 and 15 in the conventional manner until the scale is balanced. What is shown by the combined reading of the two scales however, is the weight loss due to dehydration and since the scales are calibrated in terms of percentages, the reading shows the percentage of weight (moisture) lost through dehydration and hence the percentage of moisture content in the sample of material tested.

While we have shown and described our invention in a preferred form, we are aware that various modifications can be made therein without departure from the spirit of our invention, the scope of which is to be determined by the appended claim.

What is claimed is:

A moisture testing device of the class described comprising an elongated hollow base having an elongated top wall with an opening through one end portion thereof and a dome shaped cover removably mounted on the base over and providing a compartment above said end portion of the top wall, a specimen pan in said compartment and located at said opening for holding the material to be tested, a lamp in said dome shaped cover above the pan and a blower in said hollow base below the pan for heating and circulating air through the material in the pan, a balancing beam which is fulcrumed between its ends and has the portion thereof at one side of the fulcrum projecting into the said compartment and having the pan mounted thereon, said beam having the portion thereof at the other side of the fulcrum projecting laterally from said compartment in an exposed position over the other end portion of said top wall of the casing, said latter exposed portion of the beam having poise means thereon which is movable toward and away from the fulcrum for counterbalancing the pan and its contents, said poise means being adjustable along the beam from a certain indexed minimum counterbalancing position near the fulcrum in which it counterbalances the pan, to a certain indexed maximum counterbalancing position remote from the fulcrum in which it counterbalances the pan with a certain fixed weight of material therein, and a scale along which said poise means is movable from either of said positions to the other, said scale having percentage calibrations therealong with which said poise means is registratable and which correspond to the percentages of said fixed weight that is counterbalanced by said poise means when the latter is in registration respectively therewith, and percentage indicating numbers at intervals along said scale which indicate the respective percentage of the scale at those intervals and which said numbers progressively increase in value from the aforesaid indexed maximum counterbalancing position to the aforesaid indexed minimum counterbalancing position.

ARTHUR A. ANDERSEN.
BERNARD C. MATHEWS.

References Cited in the file of this patent

UNITED STATES PATENTS

| Number | Name | Date |
|---|---|---|
| 1,089,826 | Emerson | Mar. 10, 1914 |
| 1,967,424 | Nevitt | July 24, 1934 |
| 2,047,765 | Brabender | July 14, 1936 |
| 2,569,749 | Dietert et al. | Oct. 2, 1951 |

FOREIGN PATENTS

| Number | Country | Date |
|---|---|---|
| 700,167 | France | Dec. 22, 1930 |
| 604,863 | Great Britain | July 12, 1948 |